United States Patent
Chang et al.

(10) Patent No.: US 9,280,151 B2
(45) Date of Patent: Mar. 8, 2016

(54) RECIPE MANAGEMENT SYSTEM AND METHOD

(75) Inventors: Shih-Tzung Chang, Camas, WA (US); Wei-Chin Li, Vancouver, WA (US); Richard Liu, Camas, WA (US); Jing Yin, Vancouver, WA (US)

(73) Assignee: WAFERTECH, LLC, Camas, WA (US)

( * ) Notice: Subject to any disclaimer, the term of this patent is extended or adjusted under 35 U.S.C. 154(b) by 123 days.

(21) Appl. No.: 13/471,814

(22) Filed: May 15, 2012

(65) Prior Publication Data

US 2013/0310960 A1 Nov. 21, 2013

(51) Int. Cl.
*G06F 19/00* (2011.01)
*G05B 19/418* (2006.01)

(52) U.S. Cl.
CPC *G05B 19/41865* (2013.01); *G05B 2219/31418* (2013.01); *G05B 2219/31443* (2013.01); *G05B 2219/32097* (2013.01); *G05B 2219/45031* (2013.01)

(58) Field of Classification Search
CPC ........... G05B 2219/45031; G05B 2219/32097; G05B 2219/32096; H01L 21/67276; G06F 17/2211
USPC ............... 700/27, 29, 96, 100, 105, 109, 110, 700/117, 121; 707/170–173
See application file for complete search history.

(56) References Cited

U.S. PATENT DOCUMENTS

| | | | |
|---|---|---|---|
| 6,000,830 A * | 12/1999 | Asano et al. | 700/121 |
| 6,430,572 B1 | 8/2002 | Steffan et al. | |
| 6,629,003 B1 | 9/2003 | Frizzell et al. | |
| 6,735,493 B1 | 5/2004 | Chou | |
| 6,745,142 B2 * | 6/2004 | Fu et al. | 702/84 |
| 7,248,936 B1 * | 7/2007 | Holmes et al. | 700/97 |
| 7,280,885 B1 * | 10/2007 | Brown et al. | 700/121 |
| 7,283,882 B1 * | 10/2007 | Bransky et al. | 700/96 |
| 7,873,428 B2 | 1/2011 | Ellis et al. | |
| 7,894,918 B2 | 2/2011 | Kanodia et al. | |
| 2006/0052897 A1 * | 3/2006 | Liao | 700/108 |
| 2006/0178768 A1 * | 8/2006 | Chung et al. | 700/121 |
| 2008/0065696 A1 * | 3/2008 | Ahmed et al. | 707/104.1 |
| 2008/0133163 A1 * | 6/2008 | Shanmugasundram et al. | 702/83 |
| 2009/0082894 A1 * | 3/2009 | Pettus et al. | 700/105 |
| 2009/0089024 A1 * | 4/2009 | Huang et al. | 703/2 |
| 2009/0125126 A1 * | 5/2009 | Moore et al. | 700/29 |
| 2011/0272024 A1 * | 11/2011 | Choi et al. | 136/259 |

* cited by examiner

*Primary Examiner* — Darrin Dunn
(74) *Attorney, Agent, or Firm* — Duane Morris LLP

(57) ABSTRACT

A recipe management system associates a selected process recipe with a recipe group and checks to see if other recipes of the recipe group have been updated since the selected recipe was last run. If another recipe of the recipe group has been run and adjustments have been made to the other recipe based on an analysis of a manufacturing or test run, the recipe management system identifies the selected recipe as requiring an update. The recipe management system sends error reports noting the discrepancy between a parameter setting changed in the test run and needing adjustment in the selected run. The recipe management system also effectuates the needed adjustments to the selected recipe before the selected recipe is allowed to be used in the manufacturing environment.

21 Claims, 2 Drawing Sheets

RECIPE MANAGEMENT SYSTEM AND METHOD

TECHNICAL FIELD

The present disclosure relates to recipe management systems for semiconductor and other manufacturing processes, and more particularly to recipe management systems for checking a selected recipe against other recipes, determining whether the selected recipe requires updating and updating the selected recipe as warranted.

BACKGROUND

Recipe management systems are used in semiconductor and other manufacturing facilities to manage recipes and insure that the correct recipes are run for the materials being processed, such as a semiconductor substrate or a group of semiconductor substrates, i.e. "lot", in semiconductor manufacturing. Recipe management systems are used in conjunction with the various types of semiconductor manufacturing tools used to fabricate semiconductor devices.

Recipe management systems typically include an input device in communication with several semiconductor manufacturing tools. The recipes are selected at the semiconductor manufacturing tool either manually by an engineer, technician or other personnel, or automatically when a production lot with encoded electronic instructions is loaded on the semiconductor manufacturing tool. The recipe selection is delivered by the input device to the recipe management system (RMS) which may include one or more computers and various recipes stored in data bases.

When a recipe is selected to be run in the semiconductor manufacturing facility, it must be verified as the correct recipe for the desired process operation. Each recipe includes a number of processing parameters associated with the semiconductor manufacturing processing operation in which the recipe is used. The process parameters are associated with various process conditions such as total process time, temperature, pressure, RF or other power, bias, gas or liquid flow rates, ratios of the various components delivered and utilized, dispense volume, spin speed, exposure settings, scan speed, ramp-up time, ramp-down time, and so forth. Different parameters are associated with different types of process operations and associated recipes, and each recipe is characterized by a unique set of parameter settings for the parameters.

Various factors can necessitate a change to process parameter settings. Some of the factors include a desire to produce a different product, e.g. a deposited film with a different thickness, composition, porosity, reflectivity, morphology or with other different film characteristics. The same is true for other semiconductor fabrication processes. For example, it may be desirable to increase an etch rate or produce a higher degree of anisotropy in an etching process. Other design changes may also require various changes in process parameter settings. The environment within the semiconductor manufacturing area may warrant adjustments to parameter settings in some or all processing recipes. Further, each semiconductor manufacturing tool may drift in time. Various manufacturing tools that are the same model, may drift differently and corrections in the way of adjusted parameter settings may be required to compensate for the indicated drift of the particular tool. Further, the quality or concentration of a source material such as a processing gas, a coating material or an evaporation target, may warrant changes in settings for various processing parameters in various recipes.

In summary, many factors may necessitate change to one or more process parameter settings. The change may be warranted in all process recipes, related process recipes, or only in individual process recipes. It would be desirable to be confident that a selected recipe includes the correct settings for all process parameters.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. Like numerals denote like features throughout the specification and drawing.

DETAILED DESCRIPTION

Figure 1:
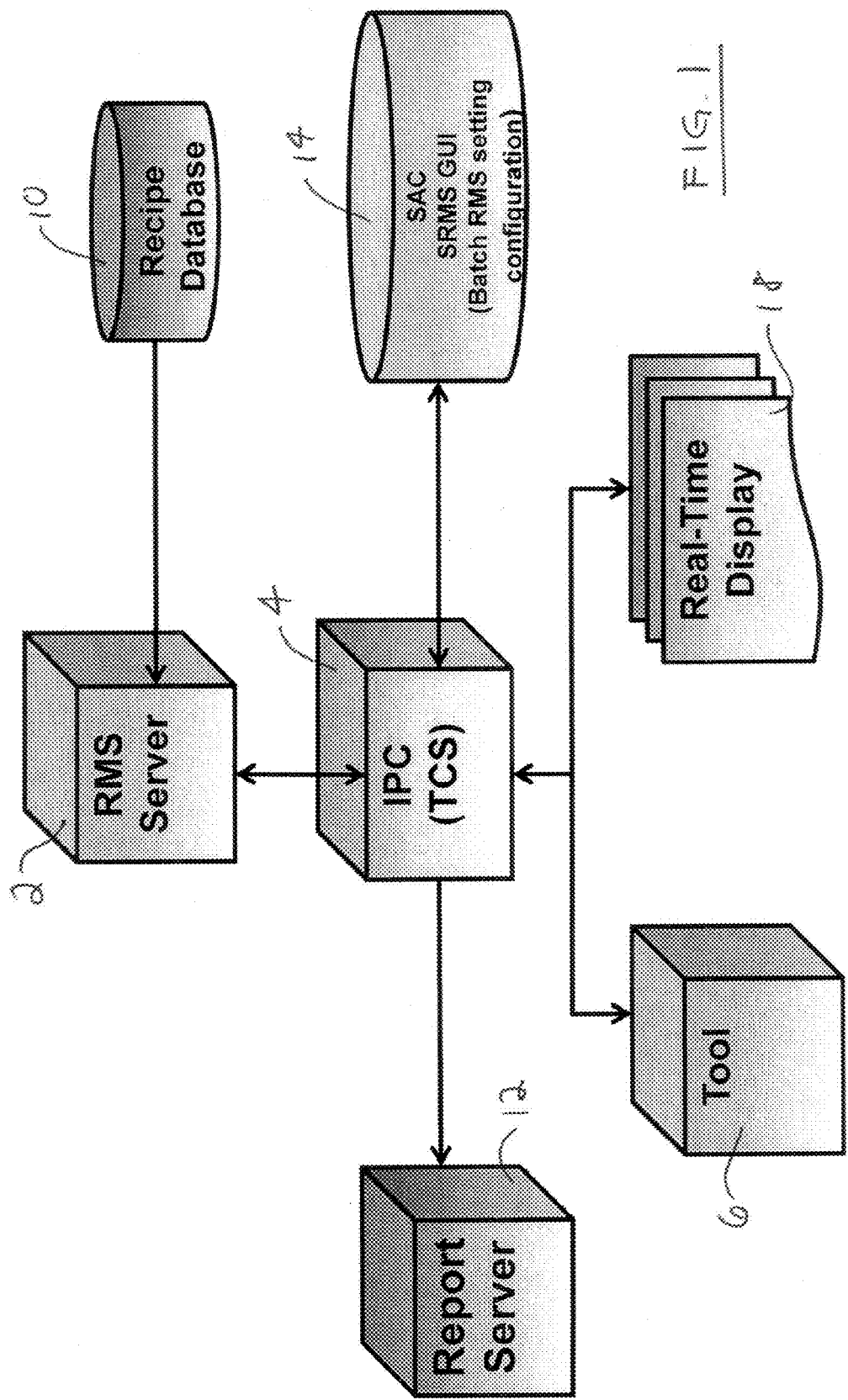
FIG. 1 is a block diagram of an embodiment of a semiconductor manufacturing system including a recipe management system.

FIG. 1 is a block diagram of a process recipe management and automation system according to an embodiment of the disclosure. In the process recipe management and automation system of FIG. 1, a processor such as Industrial PC (IPC) 4, is connected to RMS server 2 through a network or other suitable electronic communication systems. IPC 4 is also connected to sub-area controller (SAC) 14, and to report server 12 through the network. In one embodiment of the system, the network is an Ethernet network. In one embodiment, the network operates under the TCP/IP protocol. IPC 4 communicates with semiconductor tool 6 and real-time display 18 through serial lines such as RS-232 serial lines, in one embodiment.

RMS server 2 is connected to Industrial PC (IPC) 4. In one embodiment, IPC 4 includes a Computer Integrated Manufacturing (CIM) software package including a Tool Control System (TCS) for implementing task flow control for operating semiconductor tools such as semiconductor manufacturing tool 6. Semiconductor manufacturing tool 6 represents any of various different semiconductor manufacturing tools used to fabricate semiconductor devices, in various embodiments. In one embodiment, semiconductor manufacturing tool 6 is a deposition tool such as a chemical vapor deposition (CVD) tool which may be a low pressure CVD (LPCVD) tool, a plasma enhanced CVD (PECVD) deposition tool or other types of CVD tools. In another embodiment, semiconductor manufacturing tool 6 is another kind of deposition tool such as an atomic layer deposition (ALD) deposition tool. In another embodiment, semiconductor manufacturing tool 6 is a tool that forms films using epitaxial growth. In other embodiments, semiconductor manufacturing tool 6 is an etch system. In still other embodiments, semiconductor manufacturing tool 6 is a coater, a stepper or other photolithography tool. In other embodiments, semiconductor manufacturing tool is a thermal tool such as a furnace. In other embodiments, semiconductor manufacturing tool 6 is a film formation system such as a sputtering system or an evaporation tool. Semiconductor manufacturing tool 6 represents any of various semiconductor manufacturing tools, and is not to be construed to be limited to the aforementioned examples.

RMS server 2 is coupled to IPC 4 and recipe database 10 via an Ethernet or other network or other suitable electronic communication system, as above. In one embodiment, recipe database 10 contains information that associates a particular data set with a recipe. In one embodiment, recipe database 10 associates a particular recipe with a particular lot of material being run in a particular processing operation selected on a particular semiconductor manufacturing tool. IPC 4 is also coupled to report server 12 and sub-area controller (SAC) 14. SAC 14 is a server which is a Slot Recipe Management System (SRMS) with a graphical user interface in one embodiment. IPC 4 includes a processor. Various processor types are used in various embodiments. IPC 4 also includes program instructions that are executable by the processor to carry out the disclosed functions. The program instructions are stored on a non-transitory computer readable storage medium in one embodiment. The processor is configured to communicate with servers and databases, receive recipes, interact with databases and retrieve recipes from databases, identify a recipe group or groups associated with a recipe, identify other recipes in the recipe group, compare recipes within the recipe group, issue reports as to whether a selected recipe is approved to be run and also to adjust or update a selected process recipe based upon updates made to other recipes within the associated recipe group.

The processor of IPC 4 communicates newly updated recipes to semiconductor manufacturing tool 6. In one embodiment, IPC 4 communicates with semiconductor manufacturing tool 6 and other components of the process recipe management and automation system through the network using the Semiconductor Equipment Communication Standard (SECS) via low speed RS-232 serial lines but other suitable communication protocols are used in other embodiments. Real time display 18 is used for various purposes in various embodiments. In some embodiments, real time display 18 displays the selected recipe and the recipe or recipes being compared to the selected recipe. In some embodiments, real time display 18 indicates the recipe parameters and parameter settings that are inconsistent and require adjusting. Real time display 18 also displays the adjusted selected recipe in some embodiments and also displays the error message report in some embodiments.

Figure 2:
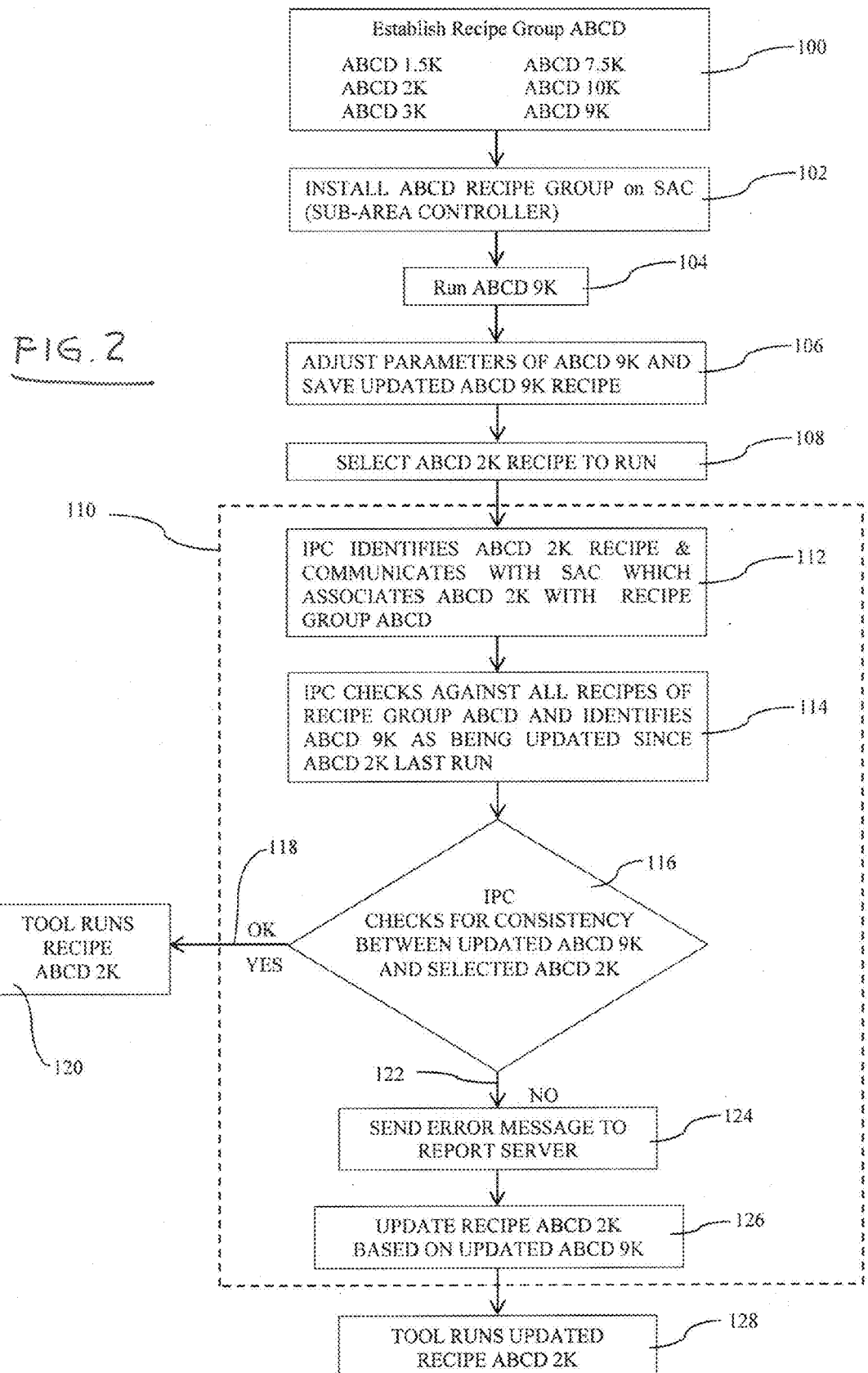
FIG. 2 is a flowchart illustrating an embodiment of a method carried out by the recipe management system of the disclosure.

FIG. 2 is an embodiment of a flowchart according to one aspect of the disclosure. At Step 100, a recipe group is established. Recipe group ABCD includes six associated recipes in the illustrated embodiment. In other embodiments, the recipe group includes more or fewer recipes. The recipe group includes multiple related recipes for carrying out a processing operation in semiconductor manufacturing tools. The processing operation may represent any kind of semiconductor manufacturing operation.

In one embodiment, the processing operation is a semiconductor manufacturing operation that is carried out using any of various semiconductor manufacturing tools and in other embodiments, the processing operation represents a semiconductor manufacturing operation that is carried out on any of multiple different processing tools. In one embodiment, the recipe group represent a group of recipes for carrying out a processing operation in a designated semiconductor manufacturing tool and in other embodiments, the recipe group represents a group of recipes that are carried out on any of multiple different processing tools In one embodiment, the recipe group involves a processing operation that is a deposition operation. In the deposition embodiment or other embodiments, each recipe includes a number of parameters. The parameters for the deposition operation include processing temperature, processing pressure, total processing time, power, flow rates for various gases, temperature ramp-up and ramp-down times and rates, relative amounts of the various gases used, processing times for various discrete steps, and so forth. In other, non-deposition embodiments, the parameters associated with each of the recipes differ. Each parameter has an associated setting, also referred to as a parameter setting, for each recipe. The setting or parameter setting is the particular value of the parameter used in the recipe. For example, one parameter is process time and the setting is "5 minutes" in one embodiment. In one embodiment, the process recipes within a recipe group may include the same settings for all except one parameter. In one deposition operation embodiment, the process recipes within a recipe group include the same settings for all parameters except process time in order to provide different recipes within the group, that produce different film thicknesses. In another deposition operation embodiment, the process recipes within a recipe group include the same settings for all parameters except flow rate for gas species "X." This provides different recipes within the group, that produce films with different compositions, i.e. different relative concentrations of "X".

In the illustrated embodiment, each recipe ABCD is a deposition recipe and the different recipes are designed to produce different film thicknesses. For example, "ABCD 1.5 K" is used to produce 1.5 K angstroms of a particular film and recipe "ABCD 10 K" is designed to produce 10 K angstroms of the same film. For the illustrated group of process recipes, all of the process settings may be the same except for process time in one embodiment. According to the embodiment in which processing times are different among the recipes of the recipe group, the difference in processing times may be linear or nonlinear. In one embodiment, for example, the process time used in ABCD 9 K may be other than three times the time used in recipe ABCD 3 K. In other embodiments, a different parameter (other than process time) has different settings in the different recipes. In yet another embodiment, multiple parameters have different settings in the different recipes.

In other deposition embodiments, all of the recipes in a recipe group are directed to produce a film having the same thickness with the different recipes varying by a gas flow parameter setting. According to this embodiment, the different recipes of the recipe group are designed to produce films with a different film composition. According to this embodiment, each of several recipes of the recipe group may be directed to producing a different ratio of two or more components of the produced film.

A recipe group established at Step 100. At Step 102, recipe group ABCD is installed and stored on a server such as SAC 14 shown in FIG. 1, in one embodiment. Recipe group ABCD is saved using various methods for saving data on a server. SAC 14 associates each of the individual recipes with the recipe group ABCD and therefore also associates each recipe with the other recipes of recipe group ABCD.

At Step 104, recipe ABCD 9 K is run in a semiconductor manufacturing tool. The run may be a normal production run or it may be a test run. In one embodiment, recipe ABCD 9 K represents a "golden" recipe used as a monitor run to determine if process parameter settings need to be changed for any of the various reasons such as mentioned in the Background section above or for any other reason. Such a "golden" recipe may be run periodically or on a regular basis, e.g. daily, as part of a monitoring program. The need to update one or more process parameter settings of the recipe that was run, based upon any of the aforementioned considerations, is determined using various measurement, morphology, and analytical tools. The present disclosure insures that, if one or more process parameter settings are made to one recipe in a recipe group, e.g. "ABCD 9 K" in this example, any necessary changes will also be made to other recipes of the process recipe group ABCD before any other selected recipe of process group ABCD is used.

After the foregoing measurement, analytical and morphology checks are carried out, one or more parameters of recipe ABCD 9 K is changed, more particularly the parameter setting is changed. The change is made or approved by the engineer or technician, in various embodiments. Recipe ABCD 9 K is updated and the updated recipe is saved at Step 106. The updated ABCD 9 K recipe is installed and stored on the manufacturing tool on which recipe ABCD 9 K was run. In some embodiments, updated recipe ABCD 9 K is also stored on other similar semiconductor manufacturing tools at Step 106.

At Step 108, recipe ABCD 2 K is selected to be run. In one embodiment, this occurs when a production run is to be made on any semiconductor manufacturing tool 6. The recipe selection may be done manually or automatically. In one embodiment, a pod or other wafer handling unit includes an RF or other electronic identification tag that is scanned by the semiconductor manufacturing tool, automatically selecting the recipe. Other methods for selecting the recipe to be run are used in other embodiments. The selected recipe is transmitted to IPC 4. Various input devices and communication systems are used to send the signal of the selected recipe from semiconductor manufacturing tool 6 to IPC 4. The steps that take place in IPC 4 are identified by dashed box 110 in FIG. 2. IPC 4 includes a processor and program instructions executable by the processor to communicate with the other system components and carry out the indicated steps. The program instructions are stored on a non-transitory computer readable storage medium in one embodiment.

At Step 112, IPC 4 identifies the ABCD 2 K recipe as having been selected and communicates with SAC 14. SAC 14 associates recipe ABCD 2 K with recipe group ABCD. More generally, SAC 14 identifies recipe group ABCD as containing recipe ABCD 2 K and also the other ABCD recipes. SAC 14 indicates to IPC 4 that a comparison of all ABCD recipes should be executed by communicating with semiconductor manufacturing tool 6. IPC 4 receives this information from SAC 14 and communicates with semiconductor manufacturing tool 6 and determines that another recipe from recipe group ABCD has been run and updated since recipe ABCD 2 K was last run, at Step 114. In the illustrated embodiment, the recipe from recipe group ABCD that has been run since recipe ABCD 2 K was last run, is recipe ABCD 9 K, but in other embodiments, another recipe of recipe group ABCD may have been run and updated since recipe ABCD 2 K was last run. In yet another embodiment, IPC 4 may determine that two or more recipes of recipe group ABCD have been run and updated since recipe ABCD 2 K was last run, via communication with SAC 14 and semiconductor manufacturing tool 6.

In some embodiments, different recipes of recipe group ABCD are run to establish changes in different parameters. With reference to the golden recipe description, above, there may be essentially two golden recipes. In one embodiment, recipe ABCD 9 K and ABCD 3 K are both run as regular monitors. In one embodiment, any change to be made to the process time parameter in recipe ABCD 2 K, is determined by an update to one recipe such as recipe ABCD 3 K which has a process time more similar to that of recipe ABCD 2 K. Also in this embodiment, any change to be made to gas flows in recipe ABCD 2 K are made based upon test results and updates to process recipe ABCD 9 K or ABCD 10 K which produce a thicker film that is more easily analyzed.

At Step 116, IPC 4 checks for consistency between any updated ABCD recipes and selected recipe ABCD 2 K by communicating with the appropriate semiconductor manufacturing tool or tools 6. In the illustrated embodiment, only recipe ABCD 9 K has been updated since recipe ABCD 2 K was last run, but in other embodiments, other recipes from recipe group ABCD will have been updated since selected recipe ABCD 2 K was last run and at Step 116, IPC 4 checks for consistency between any updated ABCD recipes and selected recipe ABCD 2 K. If the check for consistency reveals that selected recipe ABCD 2 K has been updated consistent with the changes to the updated recipe(s), i.e. "Yes" 118, IPC 4 provides instructions that semiconductor manufacturing tool 6 is allowed to run the recipe ABCD 2 K at Step 120. In one embodiment, the consistency verification may indicate that one or more process parameters of recipe ABCD 2 K were adjusted responsive to an update in the same parameters in another recipe such as ABCD 9 K of recipe group ABCD. In another embodiment, the consistency verification may indicate that one or more settings of the process parameters of recipe ABCD 2 K lie within an acceptable range based upon an update to the same parameters in another recipe of recipe group ABCD such as recipe ABCD 9 K.

If it is determined that recipe ABCD 2 K has not been updated for consistency, i.e. it has not been "aligned" with the changes to recipe ABCD 9 K, i.e. "No" 122, IPC 4 sends an error message at Step 124. In one embodiment, IPC 4 sends the error message to report server 12 at Step 124. In one embodiment, the error message indicates that a parameter setting of a previously run recipe such as ABCD 9 K has been changed and indicates that the setting for this same parameter was not adjusted for consistency in ABCD 2 K. In some embodiments, the error message may be displayed upon real time display 18. The error message contains additional information such as the desired new setting value for the indicated parameter in recipe ABCD 2 K based upon the change to recipe ABCD 9 K, in some embodiments.

In some embodiments, IPC 4 effectuates the change or update to chosen recipe ABCD 2 K as indicated at Step 126. The updated recipe for ABCD 2 K may be displayed on real time display 18 and may be provided in a report to report server 12 in various embodiments. The updated recipe for ABCD 2 K may be provided to the appropriate semiconductor manufacturing tool or tools 6, to be saved.

At Step 126, IPC 4 updates recipe ABCD 2 K based on updated recipe ABCD 9 K, i.e. consistent with the changes made to ABCD 9 K since recipe ABCD 2 K was last run. The changes include adjustments to parameter settings for one or more parameters in process recipe ABCD 2 K. In one embodiment, the parameter in which the setting is changed, is a parameter in which recipes ABCD 2 K and ABCD 9 K differed prior to the update to recipe ABCD 9 K. Process time is an example of such a parameter according to the illustrated embodiment of FIG. 1. In another embodiment, the setting of the process parameter changed in recipe ABCD 2 K based upon changes or updates to recipe ABCD 9 K, is a parameter which had identical settings in recipes ABCD 2 K and ABCD 9 K prior to the changes to recipe ABCD 9 K. According to another embodiment, the changes to recipe ABCD 2 K involve changes in multiple parameter settings and the changes may be based upon updates made to multiple recipes of recipe group ABCD since recipe ABCD 2 K was last run. The updated recipe for ABCD 2 K may be saved in various databases. At Step 128, semiconductor manufacturing tool 6 runs the updated recipe ABCD 2 K.

According to one aspect of the disclosure, a recipe management system is provided. The system comprises: a processor configured to receive a first recipe of a recipe group; receive updates to the first recipe and a resulting updated first recipe; determine that a second recipe of the recipe group has been selected for use in a manufacturing operation; compare the second recipe to the updated first recipe; determine if the second recipe requires updating based upon the updates to the first recipe; and, if the second recipe requires updating and has not been updated based on the updated first recipe, reject the second recipe.

In another aspect of the disclosure, a recipe management and automation system is provided. The system comprises: semiconductor manufacturing tools in communication with a processor, the processor including program instructions therein. The program instructions are executable by the processor to: identify a first process recipe as having been selected to be run on a first semiconductor manufacturing tool of the semiconductor manufacturing tools; associate the first process recipe with a recipe group; determine if other process recipes of the recipe group have undergone changes since the first process recipe was last used; and change a setting of at least one parameter of the first process recipe based on the changes, if any other of the process recipes of the recipe group have undergone changes since said first process recipe was last used.

In another aspect of the disclosure, a recipe management and semiconductor fabrication system is provided. The system comprises: a semiconductor manufacturing system; at least one processor in communication with the semiconductor manufacturing system through a network; program instructions stored on a non-transitory computer readable storage medium and executable by the at least one processor to: identify a process recipe input from the semiconductor manufacturing system as selected to be run on a manufacturing tool; identify a process recipe group that includes the process recipe by communicating with a server through the network, the server associating the process recipe with the process recipe group; determine if changes have been made to a further process recipe of the process recipe group since the process recipe was last run by communicating with the server through the network. If changes have been made to the further process recipe since the process recipe was last run, the program instructions are executable by the at least one processor to send an error report indicating that the process recipe has not been updated based on the changes and update the process recipe based on the changes to produce an updated process recipe; and direct the manufacturing tool to run the updated process recipe.

The preceding merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of exemplary embodiments, it is not limited thereto. Rather, the appended claims should be construed broadly, to include other variants and embodiments of the disclosure, which may be made by those of ordinary skill in the art without departing from the scope and range of equivalents of the disclosure.

What is claimed is:

1. A recipe management system comprising:
a processor configured to receive a first recipe of an established recipe group of related recipes selected to be run on a manufacturing tool of a plurality of manufacturing tools, each of said related recipes separately used for completely carrying out a particular type of processing operation and said first recipe of said established recipe group having a set of parameters and each of other of said recipes of said recipe group having the same set of parameters serving as a set of common parameters;
receive updates to said first recipe and a resulting updated first recipe;
determine that a second recipe has been selected for use in a manufacturing operation and that said second recipe is part of said established recipe group;
compare said second recipe to said updated first recipe;
determine if said second recipe requires updating based upon said updates to said first recipe; and
if said second recipe requires updating and has not been updated based on said updated first recipe, reject said second recipe,
wherein respective recipes of said established recipe group are identified and pre-determined to produce different operation results.

2. The recipe management system as in claim 1, wherein said processor is configured to communicate with a server that associates said first and second recipes with said established recipe group and said processor is configured to receive said first recipe of said established recipe group and receive said updates to said first recipe and said resulting updated first recipe by communicating with a manufacturing tool of said plurality of manufacturing tools.

3. The recipe management system as in claim 1, wherein said processor is further configured to update said second recipe based on said updates to said first recipe to produce an updated second recipe.

4. The recipe management system as in claim 3, wherein said set of common parameters includes a first parameter and said updates to said first recipe include a setting change in at least said first parameter and wherein said updated second recipe includes a setting change in at least said first parameter.

5. The recipe management system as in claim 4, wherein said first and second recipes are deposition recipes for semiconductor manufacturing tools of said plurality of manufacturing tools and said common parameters include process time, gas flows, gas flow ratios, temperature, pressure and power.

6. The recipe management system as in claim 3, wherein:
said processor is configured to communicate, through a network, with a server associating said first and second recipes with said established recipe group and is further configured to receive said first recipe and said updates to said first recipe by communicating with a semiconductor manufacturing tool of said plurality of manufacturing tools; and
at least a first parameter of said set of common parameters includes different settings in said first and second recipes.

7. The recipe management system as in claim 6, wherein said first processing parameter comprises process time.

8. The recipe management system as in claim 6, wherein said processor is configured to update a setting of said first parameter in said second recipe, and further configured to update a setting of a second parameter of said set of common parameters in said second recipe.

9. The recipe management system of claim 3, wherein said processor is further configured to:
receive a third recipe and determine that said third recipe is part of said established recipe group;
receive updates to said third recipe and a resulting updated third recipe;
further compare said second recipe to said updated third recipe;
determine if said second recipe requires updating based upon said updated third recipe; and
if said second recipe requires updating based upon said updated third recipe, further update said second recipe based upon said updated third recipe to produce said updated second recipe.

10. The recipe management system as in claim 2, wherein said processor is further configured to approve said updated second recipe to be used in said manufacturing operation.

11. The recipe management system as in claim 1, wherein said first and second recipes are film deposition recipes for semiconductor manufacturing tools of said plurality of manufacturing tools and said recipe management system includes an industrial personal computer (IPC) that includes said processor, and a network that provides communication between said IPC and said semiconductor manufacturing tools.

12. A process recipe management and automation system comprising:
semiconductor manufacturing tools in communication with a processor, said processor including program instructions therein, said program instructions executable by said processor to:
identify a first process recipe as having been selected to be run on a first semiconductor manufacturing tool of said semiconductor manufacturing tools;
associate said first process recipe with an established recipe group of related recipes, each of said related recipes separately used for completely carrying out a particular type of processing operation and said first recipe of said established recipe group having a set of parameters and each of other of said recipes of said established recipe group having the same set of parameters serving as a set of common parameters;
determine if other process recipes of said established recipe group have undergone changes since said first process recipe was last used; and
change a setting of at least a first parameter of said set of common parameters of said first process recipe based on said changes, if any other of said process recipes of said established recipe group have undergone changes since said first process recipe was last used,
wherein respective recipes of said established recipe group are identified and pre-determined to produce different operation results.

13. The process recipe management and automation system as in claim 12, wherein said program instructions are further executable by said processor to:
approve said first process recipe to be used if no process recipes of said established recipe group have undergone changes since said first process recipe was last used.

14. The process recipe management and automation system as in claim 12, wherein:
said semiconductor manufacturing tools are in communication with said processor;
said program instructions are executable by said processor to carry out said associate by communicating with at least a server through a network; and
said program instructions are executable by said processor to change settings of multiple parameters of said set of common parameters of said first process recipe based on said changes when said changes have been undergone by more than one of said other process recipes of said established recipe group.

15. The process recipe management and automation system as in claim 12, wherein said first parameter comprises one of temperature, pressure, time, gas flow, gas percentage, power and pressure.

16. The process recipe management and automation system as in claim 12, wherein said program instructions are executable by said processor to change a setting of said first parameter based on a change in said first parameter in a second process recipe of said established recipe group.

17. The process recipe management and automation system as in claim 16, wherein said program instructions are executable by said processor to further change settings of a second parameter of said set of common parameters of said first process recipe based on a change in said second parameter in a third process recipe of said established recipe group and wherein each of said first and second parameters comprise one of temperature, pressure, process time, gas flow, gas percentage, power and pressure.

18. The process recipe management and automation system as in claim 12, wherein said program instructions are further executable by said processor to:
receive updates to a second process recipe of said other process recipes and a resulting updated second process recipe;
determine that said second process recipe is part of said established recipe group;
compare said selected first process recipe to said second process recipe; and
determine if said first recipe process requires updating based upon said updates to said second process recipe.

19. A recipe management and semiconductor fabrication system comprising:
a semiconductor manufacturing system;
at least one processor in electronic communication with said semiconductor manufacturing system;

program instructions stored on a non-transitory computer readable storage medium and executable by said at least one processor to:

identify a first process recipe input from said semiconductor manufacturing system as selected to be run on a manufacturing tool;

identify an established process recipe group that includes said first process recipe by communicating with a server through said network, said server associating said first process recipe with said established process recipe group of related recipes in which each of said related recipes is separately used for completely carrying out a particular type of processing operation and said first process recipe of said established recipe group includes a set of parameters and each of other of said process recipes of said established process recipe group includes the same set of parameters serving as a set of common parameters;

determine if changes have been made to a further process recipe of said established process recipe group since said first process recipe was last run by communicating with said semiconductor manufacturing system;

if changes have been made to said further process recipe since said process recipe was last run, send an error report indicating that said first process recipe has not been updated based on said changes and update said first process recipe based on said changes to produce an updated first process recipe; and direct said manufacturing tool to run said updated first process recipe, wherein respective recipes of said established recipe group are identified and pre-determined to produce different operation results.

20. The recipe management and semiconductor fabrication system as in claim 19, wherein at least a first process parameter of said set of common parameters has different settings in said first process recipe and said further process recipe, and wherein said changes are changes to a second process parameter of said further process recipe and said update comprises a change in said second process parameter.

21. The recipe management and semiconductor fabrication system as in claim 19, wherein at least a first process parameter of said set of common parameters has different settings in said first process recipe and said further process recipe before said changes were made to said further process recipe, and wherein said changes are changes to said first process parameter of said further process recipe and said update comprises a change in said first process parameter.

* * * * *